May 11, 1965

JAMES E. WEBB
ADMINISTRATOR OF THE NATIONAL AERONAUTICS
AND SPACE ADMINISTRATION
RADAR RANGING RECEIVER 3,183,506

Filed April 2, 1962

INVENTOR.
MAHLON F. EASTERLING
BY
ATTORNEYS

May 11, 1965
JAMES E. WEBB
ADMINISTRATOR OF THE NATIONAL AERONAUTICS
AND SPACE ADMINISTRATION
RADAR RANGING RECEIVER
3,183,506
Filed April 2, 1962
2 Sheets-Sheet 2
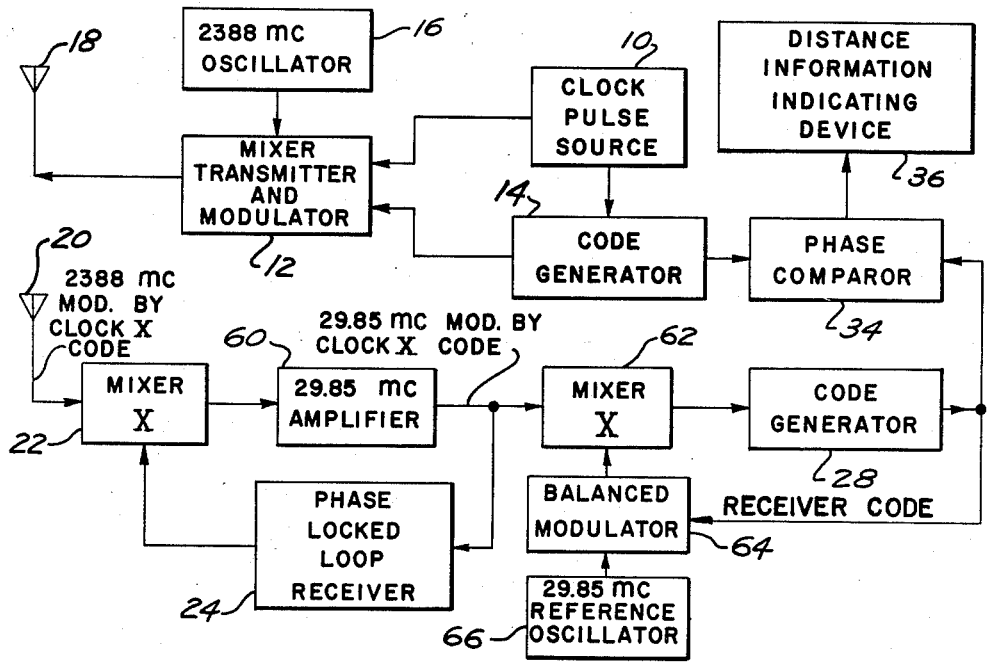
FIG.3
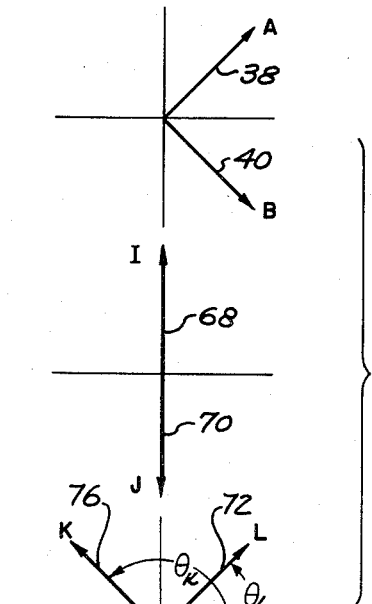
FIG.4
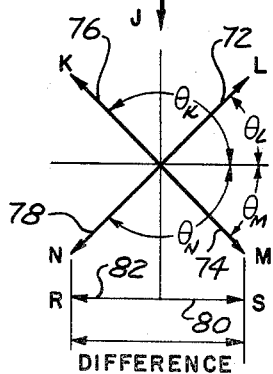
INVENTOR.
MAHLON F. EASTERLING
BY
ATTORNEYS United States Patent Office 3,183,506
Patented May 11, 1965

3,183,506
RADAR RANGING RECEIVER
James E. Webb, Administrator of the National Aeronautics and Space Administration, with respect to an invention of Mahlon F. Easterling
Filed Apr. 2, 1962, Ser. No. 184,649
3 Claims. (Cl. 343—17.2)

This invention relates to radar signal-receiving systems and, more particularly, to improvements therein.

For determining the distance from a radar transmitting system to a distant object, the transmitting system broadcasts a signal which is directed at the object. The time required for the signal to travel to the object and to return is measured, and from this information the distance information is determined. The range of the radar system can be greatly increased if the radar signal is modulated by a coded signal, such as a sequence of positive and negative pulses. The distance to the distant object may then be found by comparing the code of the received signal with the code that is being sent. A local code similar to the transmitted code but continuously shifted in phase is multiplied with the received code. When the codes are in phase, their product is always positive or negative, and a direct current results. By measuring the amount by which the local code must be shifted to obtain a direct-current output, the distance to the distant object can be calculated.

Although with this arrangement the range of the radar system is extended, a limitation is imposed by the presence of noise in the received signal which serves to mask the desired reflected signal to the point where it is unintelligible to the receiving system.

An object of this invention is to provide an improved receiving system for extending the range of a radar system.

Another object of the present invention is the provision of a novel arrangement in a receiver for increasing the signal-to-noise ratio of the received signal.

Yet another object of the present invention is the provision of a novel, useful, and improved radar receiver arrangement.

These and other objects of the invention may be achieved in a receiver in accordance with this invention by first heterodyning the incoming signal, comprising a carrier frequency which is phase-modulated by the product of clock signals and code signals, down to a suitable intermediate frequency, and thereafter heterodyning the intermediate frequency with a signal consisting of an oscillation at the intermediate frequency which is balance-modulated by code signals identical with the code signals which were modulated on the incoming signal. The resultant enables the detection of the clock signals which were modulated on the incoming signal. These are used to synchronize a code generator identical with the code generator in the transmitter. The output of the code generator is then compared in phase with the transmitter code generator for providing distance information.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 3 is a block diagram of a radar system including a receiving system in accordance with this invention; and FIGURE 4 comprises a phasor diagram which is derived from signals which occur in the system represented by FIGURE 3.

Figure 1:
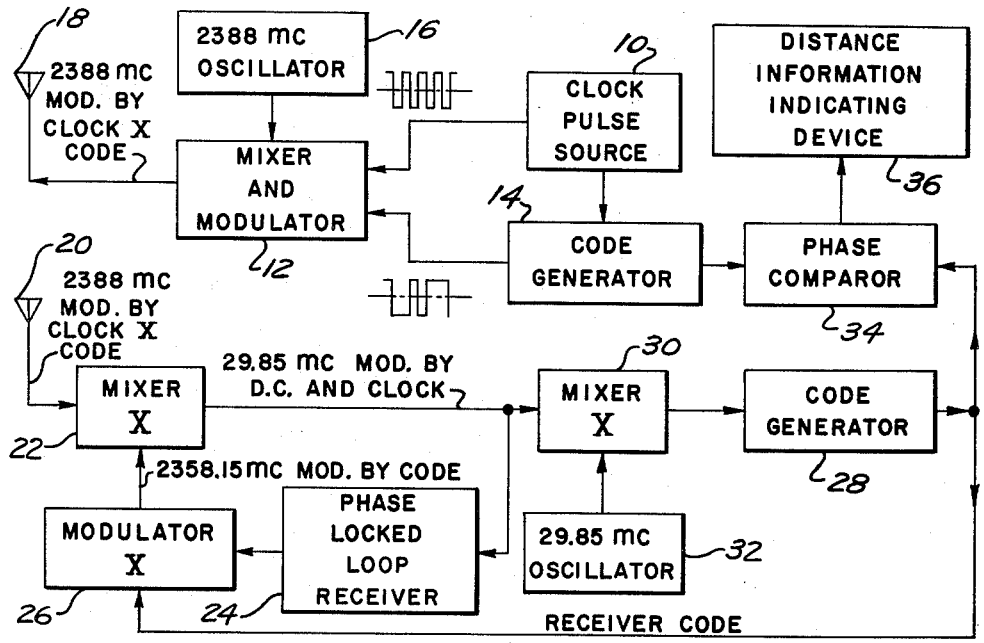
FIGURE 1 is a block diagram of a radar system in accordance with the prior art, which is shown to provide an appreciation of this invention.

Referring now to FIGURE 1, there may be seen a radar system of the type presently employed. This is shown in order to provide a better understanding of the differences and improvements which result when a radar system in accordance with this invention, as is shown in FIGURE 3 herein, is employed. The circuits of the radar system shown herein are represented by block diagrams, since these circuits are well known in the art, and to reproduce them in detail would only serve to add to the complexity of the explanation of the invention without adding to its clarity. The radar system in FIGURE 1 includes a clock-pulse source 10, which applies clock pulses to both a mixed and modulator 12, and to a code generator 14. The clock pulses from the source 10 are used to synchronize the operation of the code generator, whose function it is to provide a pseudo-random sequence of positive and negative pulses, which repeats after a period of time of perhaps a few seconds. The output of the code generator 14 is also applied to the mixer and modulator 12.

A source of oscillations 16, exemplified here at 2388 mc., also applies its output to the mixer and modulator 12. The mixer and modulator serves to phase-modulate the 2388 mc. signal by the product of the clock-pulse signals and the code signals. The output of the mixer and modulator 12 is applied to an antenna 18, to be radiated into space. An object in space will reflect these signals to a receiver antenna 20. These reflected signals are applied from the receiver antenna 20 to a mixer 22. The received signals comprise a 2388 mc. signal which is phase-modulated by the product of the clock and code signal.

Also applied to the mixer 22 is a locally generated signal comprising an oscillation of 2358.15 mc. which is phase-modulated by the code. When the incoming code and the receiver code are in phase, the output of the mixer 22 comprises a D.C. signal, plus the clock signal, both modulating a 29.85 mc. signal. The output of the mixer 22 is fed to a phase-locked loop receiver which follows the carrier and produces as its output a carrier having a frequency of 2358.15 mc. This carrier is applied to one input of a modulator 26, to be phase-modulated by the code output of a code generator 28. The difference between the signal received by the antenna 20 and the output of the modulator 26 constitutes the output of the mixer 22.

When the code on the incoming signal applied to the mixer 22 and the code applied to the mixer 22 from the modulator 26 are in phase, an output is provided by the mixer 22 which comprises a D.C. signal plus the clock signal, both modulating a 29.85 mc. signal. The manner in which the code modulating the 2358.15 mc. signal is maintained in phase with the incoming code will become apparent from what follows. A 29.85 mc. oscillator 32 provides local oscillations for the mixer 30. The output of the mixer 30 will then comprise clock signals. These are applied to the code generator 28, which is identical with the code generator 14. The clock signals synchronize the generation of the code signals by the code generator 28. For this reason, the code-generator output is in phase with the code on the received signals. With care being taken to insure that the cycle of code repetition of the code generator is longer than the time required for a radiated signal to go and return from a target, the difference in phase between the output of the code generator 14 and the code generator 28 will represent a measure of the distance of the target from the radar system location. The output of the code generator 14 and the code generator 28 are applied to a phase comparator 34. The phase comparator output is applied to a distant information-indicating device 36. This comprises any circuit arrangement for indicating a distance in response to a signal representative thereof.

Figure 2:
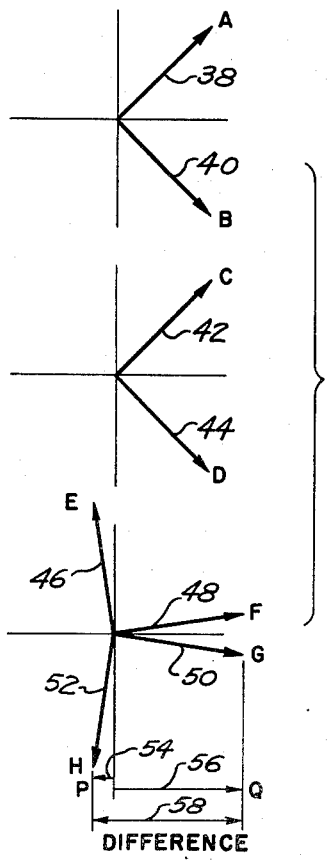
FIGURE 2 is a phasor diagram of signals which occur in the radar system shown in FIGURE 1.

FIGURE 2 represents a phasor diagram of some of the signals which occur in the receiver. For example, the phases of the incoming signal may be represented by the two arrows, respectively 38, 40. The arrow 38 represents the maximum positive product of the code and clock signals, and the arrow 40 represents the maximum negative product of the code and clock signals. The respective maximum positive and maximum negative phases of the 2358.15 mc. signal may be represented by the respective arrows 42, 44. When the incoming clock-times-code-signal product is mixed with the local-code-signal product, all combinations of phasors 38 or 40 times phasors 42 or 44 occur in the 29.85 mc. signal. These combinations are represented by the phasors 46, 48, 50, 52. The real part of these phasors, represented by the respective arrows 54 and 56 (phasor times cosine of angles) represents the amplitude of the square clock waveform which is found in the 29.85 mc. signal. The arrow 58 shows this total amplitude. The system thus far described is known and used and constitutes the prior art.

It will be appreciated that since the clock signal modulated on the received signal is demodulated and then used for synchronizing code generation, whereby the distance to the target may be determined, it is important to make the demodulated clock signal larger than the noise signal. The larger the demodulated clock signal with respect to noise, the more accurate the operation of the system and the further its range can be extended. This invention provides for a larger clock-output signal by mixing the incoming clock-times-code-product signal with a signal balance-modulated by the local code. The balance modulation results in a clock signal with substantially greater peak-to-peak voltage, while the accompanying noise remains the same. FIGURE 3 is a block diagram of a radar system in accordance with this invention, whereby the foregoing may be accomplished. Similar functioning structures in FIGURE 3 as those which are shown in FIGURE 1 bear the same reference numerals. Thus, the transmitting portion of the radar system is the same as that shown and described in connection with FIGURE 1. The signal received by the receiver antenna 20 will constitute the same 2388 mc. signal, phase-modulated by the product of the clock and code-generator signals. These are applied to a mixer 22, which has applied to its other input the output of a phase-locked loop receiver comprising an unmodulated 2358.15 mc. signal. Accordingly, the output of mixer 22 at this time is a signal comprising an intermediate-frequency carrier of 29.85 mc., which is modulated by the product of the clock and code signals.

The mixer 22 output is applied to an intermediate-frequency amplifier 60. The output of the intermediate-frequency amplifier is applied to the input of the phase-locked loop receiver 24, from which the 2358.15 carrier frequency signal is derived, and, also, to the input of another mixer 62. A second input to the mixer 62 is the output of a balanced modulator 64. This balanced modulator 64 has as its two inputs the output of the code generator 28, comprising code signals, and the output of a 29.85 mc. reference oscillator 66. Thus, the output of the balanced modulator 64 comprises 29.85 mc., which is balance-modulated by the code signals. The mixer 62 output will comprise clock signals. These are applied to the code generator 28, to synchronize the code generator therewith.

The code generator 28 output is also applied to a phase comparator 34, which receives as its other input the output of the code generator 14. The difference in phase between the outputs of the two code generators, respectively 14 and 28, enables the phase comparator to produce an output signal which represents the distance of the target from the radar system. The distance-information-indicating device 36 operates in response to this signal to produce an indication of the distance of the object which has caused the echo signal.

Referring now to FIGURE 4, there may be seen phasor diagrams representative of the signals occurring in the receiver shown in FIGURE 3. As before, the phasors 38 and 40 respectively represent the maximum positive product of the incoming code and clock signals and the maximum negative product of the incoming code and clock signals. The vectors 68, 70 represent the balance-modulated output of the balanced modulator 64. The resultant phasors which are produced in the mixer 62 are represented by the arrows 72, 74, 76, 78. The real portions of these phasors, represented by the arrows 80, 82, have a larger difference than the real portion of the phasors 54, 56. As a result, the clock signals at the output of the mixer 62 are larger than the clock signals at the output of the mixer 30 in FIGURE 1. The peak-to-peak output 80, 82 depends on the difference in cosine of the angles $\theta$ of the phasors representing negative and positive values of the clock signals. This difference is greatest when the input to the mixer 62 is balance modulated.

In the system shown in FIGURE 1, neither the 2388 mc. transmitted carrier signal nor the 2358.15 mc. local frequency signal can be balance-modulated to obtain a large clock output because the difference frequency of 29.15 mc. is needed to precisely fix the 2358.15 signal. If the 2388 mc. transmitted signal is shifted in frequency by Doppler effect when reflected from a moving target, the 2358.15 mc. signal must be slightly shifted in frequency to maintain the 29.15 mc. difference.

There has accordingly been shown and described herein a novel, useful, and improved radar-ranging receiver system whereby improved operation and extension of the range of operation of the system is achieved.

I claim:

1. In a radar-ranging system of the type wherein there is transmitted a carrier frequency modulated by the product of a clock and code signal and a receiver receives these signals reflected from a target, separates the clock signal from the received signals, generates the code signal synchronized by the clock and compares this for phase difference with the transmitted code signal, the improvement in a receiver in said system comprising means for converting the received signals comprising a carrier modulated by the product of clock and code signals to an intermediate-frequency oscillation modulated by the product of clock and code signals, a local oscillator for generating signals at the intermediate-frequency oscillation, a balanced modulator having two inputs and an output, a code generator, means for respectively applying the output of the local oscillator and code generator to the resepective two balanced modulator inputs, means for mixing the intermediate-frequency signal modulated by the clock and code signals with the output of the balanced modulator to derive therefrom clock signals, and means for applying said clock signals to said code generator to synchronize the output therefrom therewith.

2. In a radar-ranging system of the type wherein a carrier frequency-modulated by the product of clock and code signals is transmitted to be reflected from a target to a receiver wherein said clock signals are demodulated from the received signals and are employed for regenerating said code signals, and said generated code signals are compared in phase with the transmitted code signals for determining the distance of the target, the improvement in said receiver for deriving said clock signals from the received signals comprising code-generator means, means for generating local oscillations, means for balance-modulating said local oscillations with the output of said code-generator means, means for mixing said received signals with said balance-modulated local oscillation for providing the clock signals from said received signals, and means for applying said clock signals to said code generator means for synchronizing the operation of said code-generator means therewith.

3. In a radar system of the type wherein signals comprising a carrier modulated by the product of clock signals and code signals is transmitted to a distant target to be reflected and thereafter received and utilized by said receiver for indicating the distance of said target, the improvement in said receiver for said signals comprising means for converting said received signals to an intermediate frequency modulated by the product of said clock and code signals, means for generating local code signals which are identical with the code signals on said received signals, means for generating local oscillations having the frequency of said intermediate frequency, means for balance-modulating said code oscillations with said locally generated code signals, means for mixing the output of said means for balance-modulating and said intermediate-frequency modulated by said clock and code signals to provide as a resultant clock signals, and means for synchronizing the operation of said means for generating said code signals with said clock signals.

References Cited by the Examiner
UNITED STATES PATENTS

| | | | |
|---|---|---|---|
| 2,774,965 | 12/56 | De Rosa | 343—17.1 |
| 2,965,896 | 12/60 | Wright et al. | 343—17.5 |
| 3,065,465 | 11/62 | Wimberly | 343—14 |
| 3,130,404 | 4/64 | Fried | 343—14 |

CHESTER L. JUSTUS, *Primary Examiner.*

KATHLEEN CLAFFY, *Examiner.*